Jan. 15, 1946. M. E. CHUN 2,393,009
ELECTRICAL WELL LOGGING METHOD AND APPARATUS
Filed Nov. 3, 1942 2 Sheets-Sheet 1

INVENTOR
MELVIN E. CHUN
BY Lloyd Spencer
ATTORNEY

Jan. 15, 1946. M. E. CHUN 2,393,009
ELECTRICAL WELL LOGGING METHOD AND APPARATUS
Filed Nov. 3, 1942 2 Sheets-Sheet 2

INVENTOR
MELVIN E. CHUN
BY
ATTORNEY

Patented Jan. 15, 1946

2,393,009

UNITED STATES PATENT OFFICE 2,393,009

ELECTRICAL WELL LOGGING METHOD AND APPARATUS

Melvin E. Chun, La Jolla, Calif., assignor to Lane-Wells Company, Los Angeles, Calif., a corporation of Delaware Application November 3, 1942, Serial No. 464,363

4 Claims. (Cl. 175—182)

My invention relates to electrical well logging method and apparatus, and among the objects of my invention are:

First, to provide an electric logging method and apparatus which is an improvement of the C. Schlumberger Patent No. 1,819,923 issued August 18, 1931, for "Electrical process and apparatus for the determination of the nature of the geological formations traversed by drill holes," and the C. Schlumberger Patent No. 1,894,328 issued January 17, 1933, for "Electrical device for the determination of specific resistivity";

Second, to provide an electrical logging method and apparatus for measuring the potential of an electrical field esablished in the formation surrounding a well bore wherein the specific resistivity of the formation, not only close to the well bore but at predetermined distances from the well bore, is measured and averaged into a composite record;

Third, to provide a method and apparatus for electrical logging which does not increase the number of conductors required beyond the number now employed for conventional electrical logging;

Fourth, to provide a method and apparatus for electrical logging which eliminates the need of making several surveys of a well bore with different electrode spacings in order to produce a plurality of curves representative of the specific resistivity at different depths or distances from the well bore and the subsequent comparison of these individual records in order to interpret the electrical log, but instead produces a single record in which the measurements contained in the individual record have been automatically added algebraically; and Fifth, to provide a method and apparatus for electrical logging which not only reduces the time required to produce an electrical log but materially simplifies its interpretation.

With the above and other objects in view, as may appear hereinafter, reference is directed to the accompanying drawings, in which.

Figure 1:
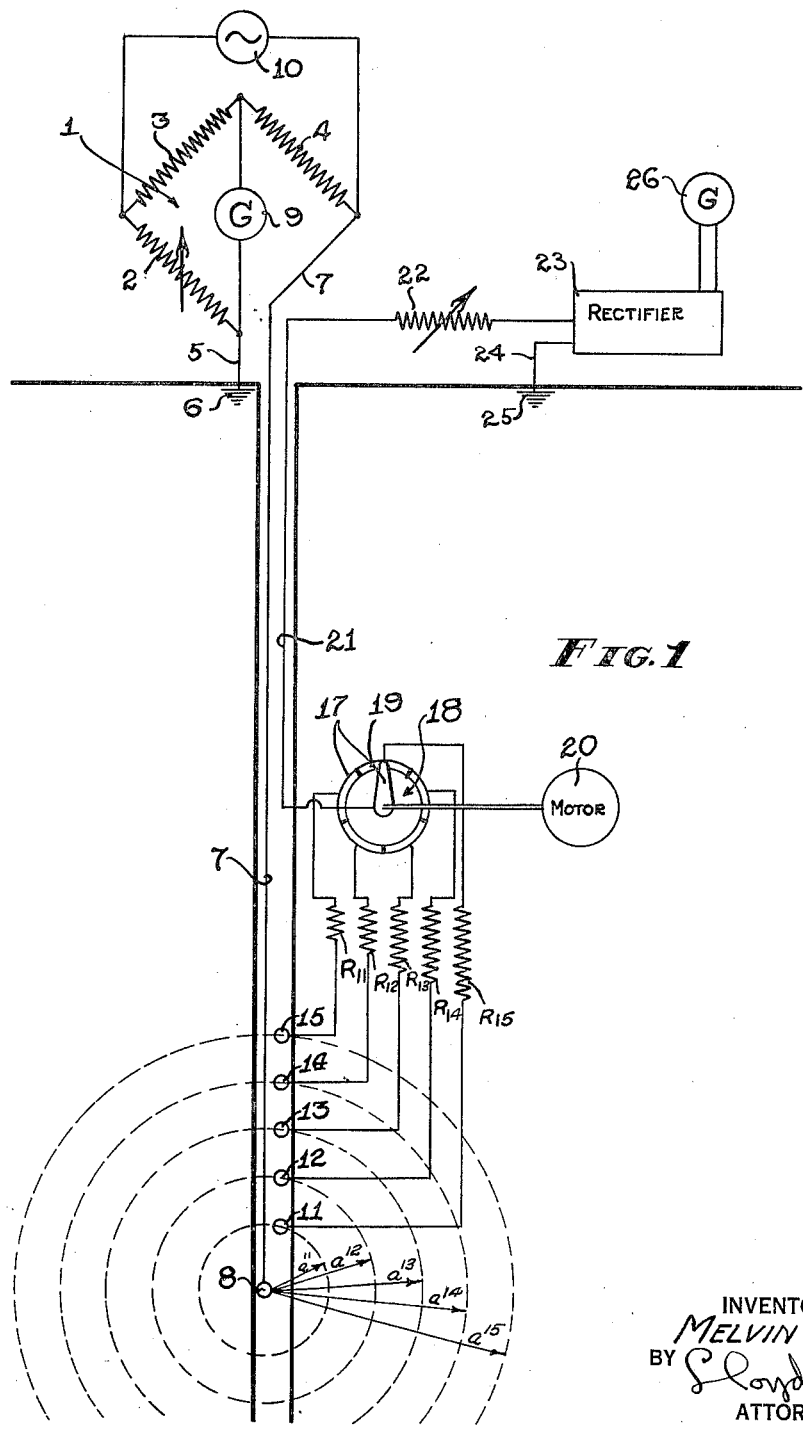
Figure 1 is a wiring diagram illustrating the apparatus employed in the exercise of my invention.

With reference to Figure 1, an input circuit is provided which comprises a Wheatstone bridge I having resistors 2, 3 and 4 forming three legs thereof; the fourth leg of the bridge is formed by the formation through which current is introduced to establish an electrical field. This is accomplished by a conductor 5 connected to resistor 2 and to a ground 6, and by an insulated conductor 7 which extends into the well bore and terminates in an electrode 8. The conductor 7 forms an element of a multiple-conductor cable, and conductor 5 may be merely grounded at the surface or form a second element of a multiple-conductor cable, in which case the ground 6 becomes another electrode in the well, or preferably may be the sheath or armor of the cable containing the insulated conductor. The galvanometer 9 may be connected between the juncture of resistors 3 and 4, and resistor 2. A source of alternating current 10 is connected between the juncture of resistors 2 and 3 and the juncture between resistor 4 and conductor 7. The foregoing apparatus is entirely conventional and other conventional means of providing either an alternating current or direct current field in the formation may be employed, such as that shown in the aforementioned patents.

A probe circuit is provided which comprises a plurality of electrodes 11, 12, 13, 14 and 15, or any greater or lesser number. These are suspended in the well bore at predetermined distances $a_{11}$, $a_{12}$, $a_{13}$, $a_{14}$ and $a_{15}$ from the input electrode 8. The probe electrodes 11, 12, 13, 14 and 15 are connected to individual resistors $R_{11}$, $R_{12}$, $R_{13}$, $R_{14}$, and $R_{15}$, respectively which, in turn, are connected individually to segments 17 of a commutator 18. The commutator is provided with a sweeper arm 19 driven preferably at a speed not less than approximately 500 revolutions per minute by a suitable motor 20, and said commutator arm is electrically connected to an insulated conductor 21 which forms an element of the multiple-conductor cable containing the conductor 7. The motor 20 may be clock-driven or electrically driven, either by batteries lowered therewith or by additional conductors connected with an electrical source at the surface. The conductor 21 is connected through a resistor 22 to the input of a suitable rectifier 23. A second return conductor 24 is connected between the rectifier input and a ground 25 to complete the circuit. The conductor 24 may if desired constitute an element of the multiple-conductor cable in which the ground 25 becomes a suitable electrode located at the top of the well bore hole or within the bore hole.

The arrangement of grounds, either for connection at the surface of the well or to the well pipe, or incorporated in the cable itself, is well established practice in the art of electrical logging; that is, while a so-called two-conductor system is illustrated, the well established three or four-conductor system may be employed.

The rectifier 23, which may be of any of the well known types such as, for example, electronic, copper oxide or synchronously commutated means, is connected to a galvanometer 26, preferably of the recording type. If a direct current input to the electrodes 6 and 8 is used, of course, the rectifier is not required and the connections from conductor 21 may be made through resistance 22 directly to the galvanometer.

The resistors $R_{11}$ to $R_{15}$, commutator 18 and motor 20 are all contained in a suitable case suspended within the bore hole from the multiple-conductor cable in proximity to the electrodes 11, 12, 13, 14 and 15, so that the conductors between these electrodes and their respective resistors $R_{11}$ to $R_{15}$ may be as short as possible.

In the art of electrical logging, which has been established by the practice of the above-mentioned patents, the potential at a pick-up or probe electrode, such as, for example, electrode 11, is for all practical purposes the potential existing at all points in the formation lying in a spherical shell having a radius $a_{11}$ equal to the distance between the input electrode 8 and the said probe or pick-up electrode 11. Although the pick-up or probe electrode 11 may be located either above or below the input electrode, the potential existing at the pick-up electrode is indicative of the specific resistivity of the volume of the formation contained within the spherical shell having the input electrode 8 as its center. Thus the pick-up electrodes or probe electrodes 11, 12, 13, 14 and 15 pick up the potentials of the surfaces of imaginary spherical shells within the formation having radii equal to the corresponding distances $a_{11}$, $a_{12}$, $a_{13}$, $a_{14}$ and $a_{15}$ between the probe electrodes and the current input electrode 8, respectively. As the distance between the probe electrodes and the current electrode increases it is apparent that an increased amount of formation surrounding the bore hole as encompassed by the corresponding spheres of increased diameters is included at the depth at which the measurement is representative; that is, the distance laterally into the formation at which the potential is measured is correspondingly increased.

Figures 2, 3:
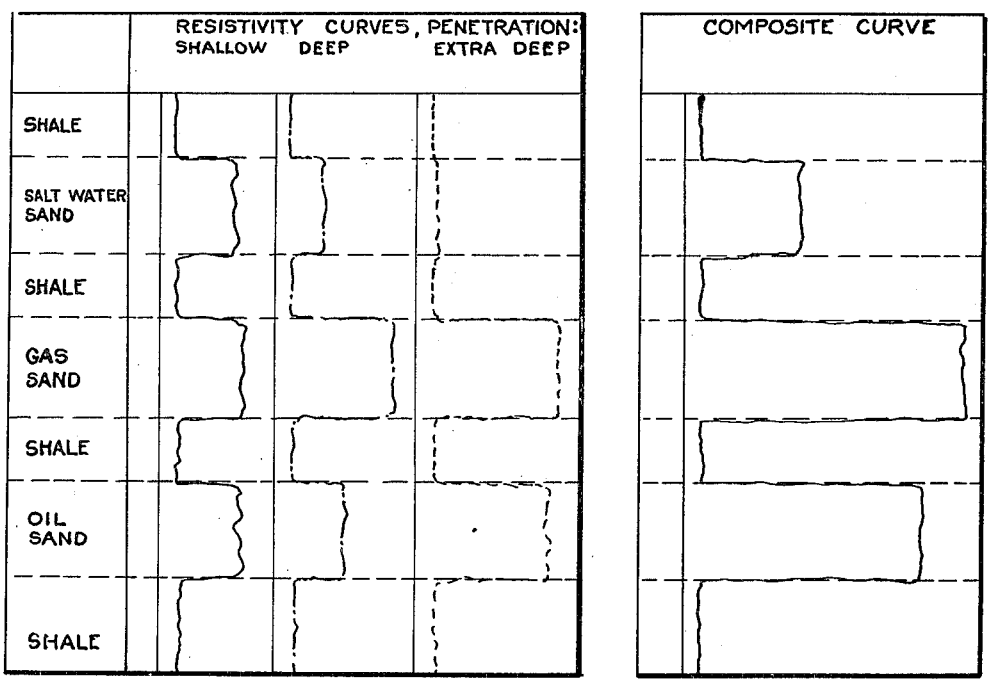
Figure 2 is an idealized chart or graph of a conventional electrical log showing typical curves made by different electrode spacings.
Figure 3 is a similar chart or graph showing the curve produced by my apparatus.

Previously it has been the custom to measure the resistivity at a point close to the input electrode and then separately measure the resistivity at one or two other points and at greater distances from the input electrode. Formerly this has been accomplished either by making several runs, changing the electrode spacing each time, or by using multiple-conductor cables in which a probe conductor extends from each probe electrode to the surface and to an independent galvanometer G. The several separate resultant resistivity curves produced by the recording galvanometers were then placed side by side for comparison. Such curves are illustrated in Figure 2.

With my apparatus and the practice of my method the galvanometer 26 is connected in rapid sequence to the several probe electrodes by means of the beforementioned motor driven commutator 18. The galvanometer 26 may be of any suitable type, but, in general, it may comprise a sensitive, direct current ammeter or voltmeter having sufficient inertia and damping in its movable element to record or indicate at the frequency of the pulsating input current and at the frequency of commutation, which is preferably in the neighborhood of 500 revolutions per minute, only a reading which is a function of the combined effect of the thus applied pulsating current or voltage or preferably a reading which is proportional to or is a significant function of the average, mean, or effective applied D. C. potential or current output from the rectifier, so as to produce in the case of a recording meter a composite curve of the type shown in Figure 3. The resistors $R_{11}$, $R_{12}$, $R_{13}$, $R_{14}$, and $R_{15}$ differ in value and compensate for the difference in the potential of the field present at the different electrodes 11, 12, 13, 14 and 15, so that with a constant current at the input electrode 8 the potentials as measured by the galvanometer have a common scale for equal values of each formation resistivity. The resistors decrease in value as the distance between the probe electrodes and the current electrode increases.

It has been established empirically, and it can be shown by mathematical analysis that for a constant current value flowing between an electrode such as illustrated at 8, located in a fluid-filled well bore hole, and a remote connection, such as that shown at the ground connection 6, the voltage or potential difference at all points lying in the spherical element of the formation surrounding the said electrode 8 as a center, varies with respect to a remote ground connection, such as that shown at 25, with distance from said electrode, substantially in accordance with the formula:

$$V = \frac{9\,pi}{40\pi a}$$

where V is the potential difference between the given point in the surrounding formation and the remote electrode, $p$ is the specific resistivity of the formation, $a$ is the radius of the sphere, and $i$ is a constant value of the current flow between electrodes 6 and 8.

Since all values on the right-hand side of the foregoing equation, except $a$, are constant, the formula may be expressed as:

$$V = \frac{K}{a}$$

In the drawings, the beforementioned potential pickup electrodes 11 to 15, inclusive, are illustrated as located in the bore hole fluid at distances from the input electrode 8 such that they are in the extension of the imaginary spherical formation element surfaces having radii $a_{11}$ to $a_{15}$, respectively.

Thus, it is apparent that the relative potentials of the electrodes 11 to 15, inclusive, will be inversely proportional to the ratios of their corresponding radii, for example:

$$V_{11} = \frac{K}{a_{11}} \text{ and } V_{12} = \frac{K}{a_{12}}$$

hence, $$\frac{V_{11}}{V_{12}} = \frac{a_{12}}{a_{11}}$$

In view of the fact, as herein before described, that for a given value of formation resistivity $p$, the potentials picked up by the several electrodes 11, 12, 13, 14, and 15 will each have different values in accordance with their distances from the input electrode 8, it is necessary to employ compensating means, such as resistances $R_{11}$, $R_{12}$, $R_{13}$, $R_{14}$, and $R_{15}$, capable of equalizing the potential input to the rectifier 23 for all such electrodes. This is necessary in order to make it possible for the galvanometer to be given the same deflection impulses when successively connected to the different electrodes under conditions of uniform formation resistivity, and so that variation or lack of uniformity of formation resistivity encountered will, therefore, have true significance. Therefore, the resistances $R_{11}$ to $R_{15}$ should have values with respect to one another which are roughly proportional to the potentials picked up by the respective electrodes to which they lead, or, in other words, the resistances should have relative values roughly inversely proportional to the relative length of the corresponding radii $a_{11}$, $a_{12}$, $a_{13}$, $a_{14}$, and $a_{15}$ of the electrodes to which they lead as shown in Figure 1.

The exact values of the resistances, $R_{11}$ to $R_{15}$, should be such that the ratios of the sums of the several resistances in each branch circuit formed through the commutator, including the resistance 22, the resistance of the inter-connecting conductor and the effective input resistance to the rectifier 23 are inversely proportional to the corresponding radii $a_{11}$, $a_{12}$, $a_{13}$, $a_{14}$, and $a_{15}$.

For example, resistance 22 may have a convenient value of from 0 to approximately 1000 ohms, the input resistance of the rectifier 23 may be in the order of 500 ohms, and the resistance of the line 21 in the conductor cable, including the earth-return, and electrode contact resistances, may be, for cables now in general use, approximately 200 ohms. Assuming the resistance 22 to be set at a suitable value of approximately 300 ohms, then the total resistance of the circuit comprising electrodes 15, resistance $R_{15}$, lines 21 and 24, and the input to the rectifier 23 will be approximately 1000 ohms.

Any desired spacings of the electrodes 8, 11, 12, 13, 14, and 15 may be employed, depending upon the depth of penetration of formations to which it is desired to make potential tests, but assuming, by way of illustration, that these spacings are all equal, then typical values of resistances $R_{11}$ to $R_{15}$ would be approximately 4000 ohms, 1500 ohms, 665 ohms, 250 and 0 ohms, respectively.

In usual practice, the potential difference between electrodes 11 to 15, and 25 would be in the order of .001–.050 volt and the total current from ground 6 to electrode 8 would preferably be low and in the order of $1 \times 10^{-6}$ to $50 \times 10^{-6}$ amperes.

Various changes and alternate arrangements may be made within the scope of the appended claims, in which it is my intention to claim all novelty inherent in the invention as broadly as the prior art permits.

I claim:

1. In an apparatus for electrically logging well bores, the combination with an input circuit including a source of electrical energy and a pair of input electrodes, at least one of which is movable along a well bore, said electrodes adapted to establish an electrical field in the formation traversed by the well bore, the combination of a probe circuit comprising: a plurality of probe electrodes adapted to be arranged in said well bore in predetermined fixed spaced relation to a movable input electrode; a measuring circuit including a conductor and a meter responsive to the potential applied to said conductor; a sequencing switch adjacent said probe electrodes for connecting said probe electrodes in succession to the conductor of said measuring circuit; and separate means connected between each probe electrode and said switch for substantially eliminating differences in the potentials applied to said measuring circuit arising from differences in the strength of said electrical field at the different probe electrodes due solely to the differences in their respective distances from said input electrode.

2. In an apparatus for electrically logging well bores, the combination with an input circuit including a source of electrical energy and a pair of input electrodes, at least one of which is movable along a well bore, said electrodes adapted to establish an electrical field in the formation traversed by the well bore, the combination of a probe circuit comprising: a plurality of probe electrodes fixed at different distances from a movable input electrode; a conductor; means connecting said probe electrodes in sequence with said conductor; an instrumentality connected with said conductor and responsive to the potential applied thereto, the period of response of said instrumentality and the rate of sequencing of said means being so related that said instrumentality indicates a mean effective value which is a function of the electrical potentials applied to said conductor as sampled by said probe electrodes; and means associated with each of said probe electrodes for substantially eliminating differences in the potentials applied to said conductor arising from differences in potentials sampled by said probe electrodes which are due solely to the differences in their respective distances from said input electrode.

3. A method of electrically logging well bores comprising: establishing an electric potential gradient surrounding a point in the formation to be tested; separately picking up the potential at each of a plurality of separate points in said potential gradient at predetermined different distances from said first mentioned point; modifying each of said picked-up potentials substantially to eliminate differences therebetween due solely to differences in distance of said separate points from said point surrounded by said potential gradient; and determining the mean value of said plurality of modified potentials.

4. A method of electrically logging well bores comprising: establishing an electric potential gradient surrounding a point in the formation to be tested; electrically probing said potential gradient at a plurality of separate points at different distances from said first point to pick up potentials at each of said points in said potential gradient; modifying said picked up potentials substantially to eliminate differences therebetween due solely to differences in distance of said separate points from said point surrounded by said potential gradient; separately impressing each of said modified picked-up potentials in rapid succession upon an electric circuit to form a pulsating potential therein; and measuring the mean effective value of the pulsating potential thus impressed upon said circuit.

MELVIN E. CHUN.